United States Patent
Feng et al.

(10) Patent No.: US 8,958,153 B2
(45) Date of Patent: Feb. 17, 2015

(54) OPTICAL POLARIZER

(75) Inventors: Chen Feng, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 475 days.

(21) Appl. No.: 12/657,912

(22) Filed: Jan. 28, 2010

(65) Prior Publication Data

US 2011/0019273 A1 Jan. 27, 2011

(30) Foreign Application Priority Data

Jul. 24, 2009 (CN) .......................... 2009 1 0109129

(51) Int. Cl.
*G02B 5/30* (2006.01)
*B82Y 20/00* (2011.01)

(52) U.S. Cl.
CPC ............... *G02B 5/3033* (2013.01); *B82Y 20/00* (2013.01); *G02B 2207/101* (2013.01); *Y10S 977/742* (2013.01); *Y10S 977/745* (2013.01); *Y10S 977/81* (2013.01); *Y10S 977/834* (2013.01)
USPC ............ 359/487.01; 359/487.04; 359/487.05; 977/742; 977/745; 977/810; 977/834

(58) Field of Classification Search
USPC ............. 359/485.03, 485.05, 487.01, 487.03, 359/487.04, 487.05; 977/890, 712, 742, 977/745, 755, 810, 834
See application file for complete search history.

(56) References Cited

U.S. PATENT DOCUMENTS

| | | | |
|---|---|---|---|
| 4,142,006 A * | 2/1979 | Choyke et al. ............... | 427/162 |
| 5,864,425 A * | 1/1999 | Filas ............................ | 359/360 |
| 6,956,698 B2 * | 10/2005 | Li et al. .................... | 359/485.05 |
| 7,045,108 B2 * | 5/2006 | Jiang et al. ................ | 423/447.2 |
| 7,054,064 B2 * | 5/2006 | Jiang et al. ............... | 359/485.05 |
| 7,645,497 B2 * | 1/2010 | Spath et al. ................. | 428/1.4 |
| 7,710,649 B2 * | 5/2010 | Feng et al. ................. | 359/489.2 |
| 7,821,192 B2 * | 10/2010 | Feng et al. .................... | 313/496 |
| 7,872,407 B2 * | 1/2011 | Fu et al. ........................ | 313/310 |
| 7,915,598 B2 * | 3/2011 | Jiang et al. ................. | 250/472.1 |
| 8,013,988 B2 * | 9/2011 | Xiao et al. .................... | 356/218 |
| 8,014,068 B2 * | 9/2011 | Cheong et al. ........... | 359/485.05 |
| 8,030,623 B2 * | 10/2011 | Jiang et al. ................. | 250/472.1 |
| 8,237,677 B2 * | 8/2012 | Jiang et al. ..................... | 345/173 |
| 2002/0172639 A1 * | 11/2002 | Horiuchi et al. ........... | 423/447.2 |
| 2004/0047038 A1 | 3/2004 | Jiang et al. | |
| 2006/0121185 A1 * | 6/2006 | Xu et al. ..................... | 427/163.1 |
| 2006/0188721 A1 * | 8/2006 | Irvin et al. ..................... | 428/402 |
| 2007/0159577 A1 | 7/2007 | Atsushi et al. | |
| 2007/0287830 A1 | 12/2007 | Sano et al. | |
| 2008/0198453 A1 * | 8/2008 | LaFontaine et al. .......... | 359/485 |
| 2008/0239489 A1 | 10/2008 | Feng et al. | |
| 2008/0252825 A1 * | 10/2008 | Kim et al. ....................... | 349/96 |
| 2009/0059368 A1 * | 3/2009 | Kamada ........................ | 359/494 |

(Continued)

FOREIGN PATENT DOCUMENTS

| | | |
|---|---|---|
| CN | 1996067 A | 7/2007 |
| CN | 101276012 A | 10/2008 |

(Continued)

*Primary Examiner* — Ricky D Shafer
(74) *Attorney, Agent, or Firm* — Novak Druce Connolly Bove + Quigg LLP

(57) ABSTRACT

An optical polarizer includes a supporting element and an optical polarizing film supported by the supporting element. The optical polarizing film includes a carbon nanotube film structure and a metallic layer disposed on the carbon nanotube film structure.

16 Claims, 9 Drawing Sheets

(56) References Cited

U.S. PATENT DOCUMENTS

2009/0321113 A1 12/2009 Allemand et al.
2010/0173376 A1* 7/2010 Ostojic et al. ................ 435/176

FOREIGN PATENT DOCUMENTS

| | | |
|---|---|---|
| JP | 59-52217 | 3/1984 |
| JP | 2004-102217 | 4/2004 |
| JP | 2006-11296 | 1/2006 |
| JP | 2007-41470 | 2/2007 |
| JP | 2007-183524 | 7/2007 |
| JP | 2008-275976 | * 11/2008 |
| JP | 2010-525527 | 7/2010 |
| WO | WO2008/131304 | * 10/2008 |

* cited by examiner

OPTICAL POLARIZER

CROSS-REFERENCE TO RELATED APPLICATIONS

This application claims all benefits accruing under 35 U.S.C. §119 from China Patent Application No. 200910109129.5, filed on Jul. 24, 2009 in the China Intellectual Property Office, the disclosure of which is incorporated herein by reference.

BACKGROUND

1. Technical Field

The present disclosure relates to optical components, particularly, to an optical polarizer.

2. Description of Related Art

Optical polarizing films generally are widely used for glare reduction and for increasing optical contrast in such products as sunglasses and liquid crystal displays (LCDs). One of the most common polarizers is a dichroic/dichromatic polarizer. The dichroic polarizer changes a natural ray to a vertically polarized ray or a horizontally polarized ray. The dichroic polarizer is made by incorporating a dichroic dye into a polymer matrix stretched in at least one direction. The dichroic polarizer can also be made by uniaxially stretching the polymer matrix and staining the polymer matrix with the dichroic dye. Alternatively, the polymer matrix can be stained with an oriented dichroic dye. The oriented dichroic dye generally includes anthraquinone and azo dyes, as well as iodine. The polymer matrix can be a polyvinyl alcohol.

However, a polarization degree of the optical polarizing film decreases when the optical polarizing film works at a temperature greater than 50° C., or works in a relatively moist environment.

What is needed, therefore, is to provide an optical polarizer with good polarization property at a relatively high temperature, or in a relatively moist environment.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
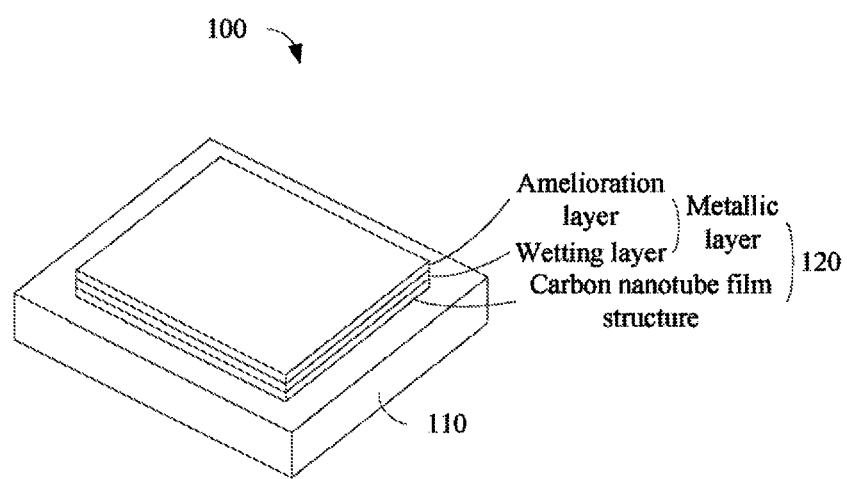
FIG. 1 is a schematic structural view of an embodiment of an optical polarizer.

Referring to FIG. 1, an optical polarizer 100 of one embodiment includes a supporting element 110 and an optical polarizing film 120 supported by the supporting element 110.

The supporting element 110 can be a frame, a transparent substrate, or combinations thereof. The optical polarizing film 120 can be directly adhered to the frame or a surface of the transparent substrate.

The optical polarizing film 120 includes a carbon nanotube film structure and a metallic layer disposed on the carbon nanotube film structure. The carbon nanotube film structure has a top surface and a bottom surface opposite to the top surface.

Macroscopically, the carbon nanotube film structure may have a substantially planar structure. The planar carbon nanotube structure can have a thickness of about 0.5 nanometers to about 1 millimeter. The carbon nanotube film structure is a free-standing film, and includes a plurality of carbon nanotubes. The carbon nanotubes in the carbon nanotube film structure are substantially aligned in a same direction.

Figure 2:
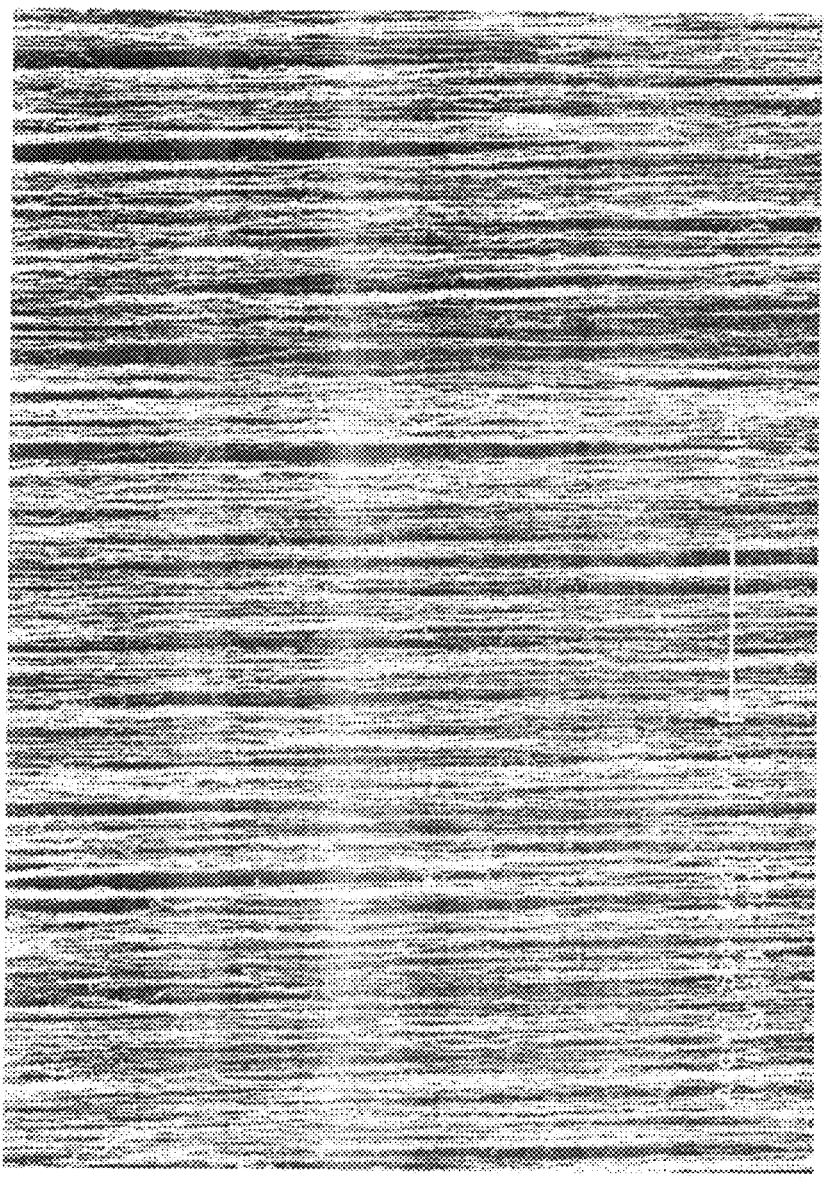
FIG. 2 shows a Scanning Electron Microscope (SEM) image of a drawn carbon nanotube film.

The carbon nanotube film structure can include at least one drawn carbon nanotube film as shown in FIG. 2. The drawn carbon nanotube film has a thickness of about 0.5 nanometers to about 100 microns. The drawn carbon nanotube film can include a plurality of successive and oriented carbon nanotubes joined end-to-end by van der Waals attractive force therebetween. The carbon nanotubes in the drawn carbon nanotube film can be substantially aligned in a single direction substantially parallel to the surface of the drawn carbon nanotube film. Each drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. Some variations can occur in the drawn carbon nanotube film. The carbon nanotubes in the drawn carbon nanotube film can also be oriented along a preferred orientation. The carbon nanotubes can define a plurality of micropores. The drawn carbon nanotube film can be formed by drawing a film from a carbon nanotube array that is capable of having a film drawn therefrom.

In one embodiment, the carbon nanotube film structure includes a plurality of stacked drawn carbon nanotube films. The number of the layers of the drawn carbon nanotube films is not limited. The thickness of the carbon nanotube film structure can be in a range from about 0.5 nanometers to about 1 millimeter. Adjacent drawn carbon nanotube films can be adhered by van der Waals attractive force therebetween. The drawn carbon nanotube films are stacked with each other substantially along the same direction to maintain most of the carbon nanotubes in the carbon nanotube film structure oriented along a preferred orientation. Thus, most of the carbon nanotubes in the carbon nanotube film structure are substantially parallel to each other and are oriented along a preferred orientation which is substantially parallel to a surface of the stacked carbon nanotube films.

A polarization degree of the optical polarizing film 120 increases with an increasing number of layers of the drawn carbon nanotube films in the carbon nanotube film structure. The polarization degree of the optical polarizing film 120 can increase with the thickness of the carbon nanotube film structure. The optical polarizing film 120 employing more layers of the drawn carbon nanotube films can achieve better polarization properties. In other embodiment, the optical polarizing film 120 can also employ only one layer of the drawn carbon nanotube film.

The metallic layer can have a thickness of about 1 nanometer to about 50 nanometers. The metallic layer can be disposed on at least one of the bottom surface and the top surface of the carbon nanotube film structure. The method for forming the metallic layer on the carbon nanotube film structure can be a chemical method (e.g., electroplating, chemical plating), or a physical method (e.g., physical vapor deposition, vacuum evaporation, ion sputtering). In one embodiment, a metallic material is evaporated to a metallic gas by vacuum evaporation. The metallic gas can be deposited on the carbon nanotube film structure thereby forming the metallic layer. The metallic material faces the top surface of the carbon nanotube film structure, the metallic gas can be only deposited on the top surface. In another embodiment, when the metallic material is evaporated at a position facing the bottom surface, the metallic gas can be deposited only on the bottom surface. Alternatively, the metallic layer can also be disposed on both the bottom surface and the top surface The material of the metallic layer can be iron (Fe), cobalt (Co), nickel (Ni), palladium (Pd), titanium (Ti), gold (Au), silver (Ag), copper (Cu), or combinations thereof. A portion of the outer surface of the plurality of the carbon nanotubes are exposed from the bottom surface and the top surface. The metallic layer can be located on the portion of the outer surface of the plurality of the carbon nanotubes. The metallic layer can also be located on the entire outer surface of the plurality of carbon nanotubes. In one embodiment, the thickness of the carbon nanotube film structure is relatively thin, and the plurality carbon nanotubes defines a plurality of micropores, thus the metallic layer is capable of being located on the entire outer surface of each of the carbon nanotubes in the carbon nanotube film structure. Microscopically, the metallic material of the metallic layer can be in a form of a plurality of metallic particles or a plurality of metallic films located on each of the plurality of carbon nanotubes.

The metallic layer can be a single layer structure or a multiple layer structure. The single layer structure can act as an amelioration layer for improving a polarization property of the optical polarizing film 120 in different wavelength regions. The amelioration layer can have a thickness of about 1 nanometer to about 40 nanometers. The material of the amelioration layer can be iron (Fe), cobalt (Co), nickel (Ni), palladium (Pd), titanium (Ti), gold (Au), silver (Ag), copper (Cu), or combinations thereof. In one embodiment, the metallic layer is a multiple layer structure. The metallic layer includes at least a wetting layer and an amelioration layer. The wetting layer and the amelioration layer can be formed on the carbon nanotube film structure one by one. The wetting layer is the innermost layer and covers the carbon nanotube film structure. The amelioration layer covers the wetting layer. The wetting layer can be configured for providing a good transition between the carbon nanotube film structure and the amelioration layer. The use of a wetting layer can be optional, if the amelioration layer has a good wettability property to the carbon nanotubes. The wetting layer can have a thickness of about 1 nanometer to about 10 nanometers. The material of the wetting layer can be iron (Fe), cobalt (Co), nickel (Ni), palladium (Pd), titanium (Ti), or combinations thereof. In one embodiment, the wetting layer is a nickel layer with a thickness of about 2 nanometers. The amelioration layer is a gold layer with a thickness of about 30 nanometers. The gold layer can improve the polarization property of the optical polarizing film 120 in an infrared region.

Figure 3:
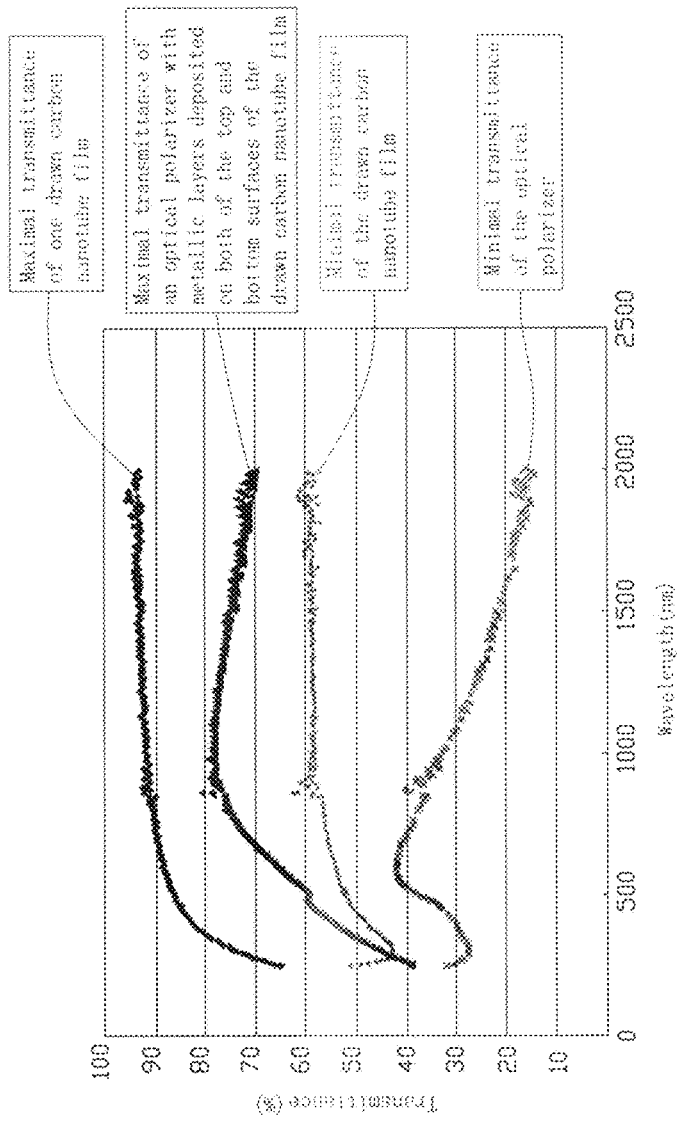
FIG. 3 shows a comparison of transmittance curves between the optical polarizer showed in FIG. 1 and an optical polarizer consisting of the drawn carbon nanotube film.

A polarized light can be employed to test the optical polarizing film 120 and one drawn carbon nanotube film without the metallic layer. The drawn carbon nanotube film comprises carbon nanotubes. When a polarizing direction of the polarized light is substantially parallel to most of the carbon nanotubes in the carbon nanotube film structure, the polarized light is absorbed the most, and minimal transmittance is achieved. When the polarizing direction of the polarized light is substantially perpendicular to most of the carbon nanotubes in the carbon nanotube film structure, the polarized light is absorbed the least, and maximal transmittance is achieved. Referring to FIG. 3, a maximal transmittance and a minimal transmittance of the optical polarizing film 120 and the pure drawn carbon nanotube film in different wavelength regions can be compared. The optical polarizing film 120 includes one drawn carbon nanotube film and metallic layers deposited on both the top and bottom surfaces of the drawn carbon nanotube film. The metallic layer is a multiple layer structure. The metallic layer includes at least a wetting layer and an amelioration layer. The wetting layer is a nickel layer with a thickness of about 2 nanometers. The amelioration layer is a gold layer with a thickness of about 30 nanometers. The maximal transmittance of the polarizing film 120 is less than the maximal transmittance of the drawn carbon nanotube film in most of the wavelength regions. The minimal transmittance of the optical polarizing film 120 is less than the minimal transmittance of the drawn carbon nanotube film in most of the wavelength regions. If the wavelength of the polarized light is greater than 500 nanometers, the maximal transmittance and minimal transmittance of the polarizing film 120 is less than the maximal transmittance and minimal transmittance of the drawn carbon nanotube film. The maximal transmittance and minimal transmittance of the polarizing film 120 decrease with the wavelength of the polarized light, if the wavelength is greater than 750 nanometers.

Figure 4:
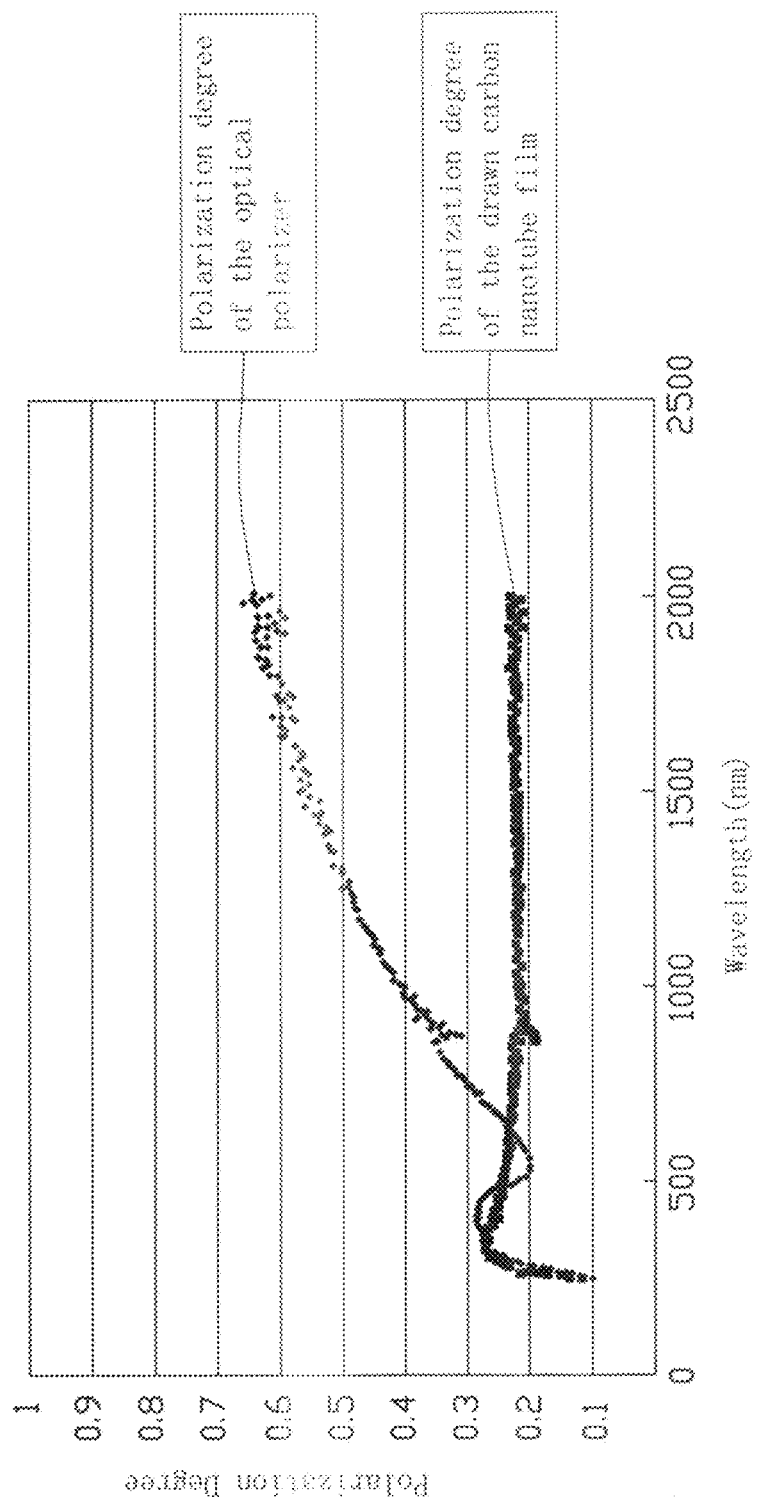
FIG. 4 shows a comparison of polarization degree curves between the optical polarizer showed in FIG. 1 and the optical polarizer consisting of the drawn carbon nanotube film.

The polarization degree can be defined as $(T_{max}-T_{min})/(T_{max}+T_{min})$, wherein the $T_{max}$ is the maximal transmittance, and the $T_{min}$ is the minimal transmittance. Referring to FIG. 4, the polarization degree of the optical polarizing film 120 is greater than the degree of the polarization degree of the drawn carbon nanotube film in most of the wavelength regions. If the wavelength of the polarized light is greater than 580 nanometers, the polarization degree of the optical polarizing film 120 is greater than the degree of the polarization degree of the drawn carbon nanotube film. The polarization degree of the optical polarizing film 120 increases with the wavelength of the polarized light, if the wavelength is greater than 750 nanometers. The optical polarizing film 120 can have a good polarization property for infrared lights as shown in FIG. 4.

Figure 5:
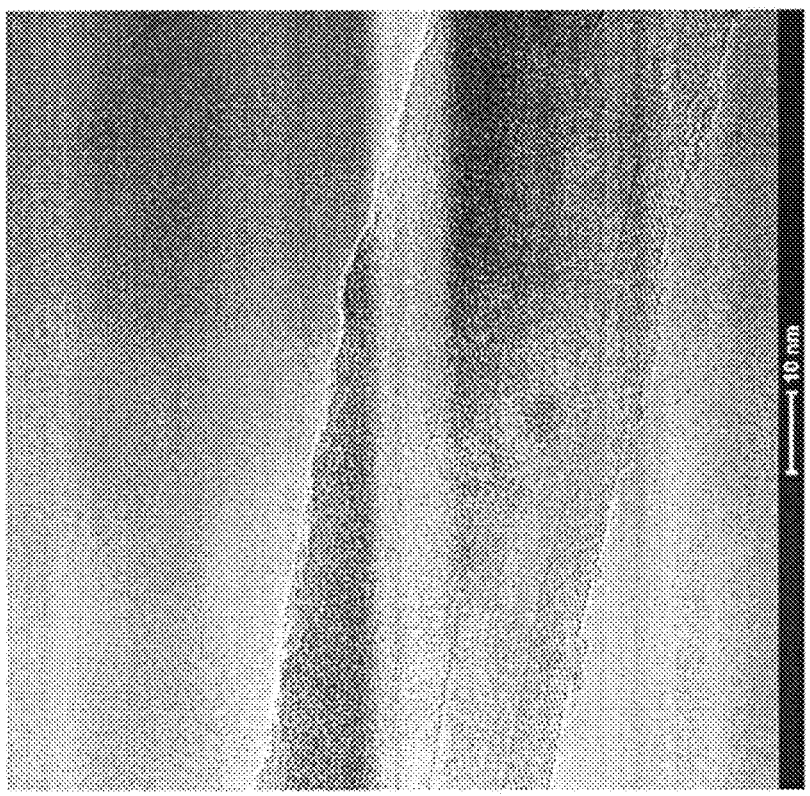
FIG. 5 shows a Transmission Electron Microscope (TEM) image of a carbon nanotube with a nickel layer of about 2 nanometers thick.
Figure 6:
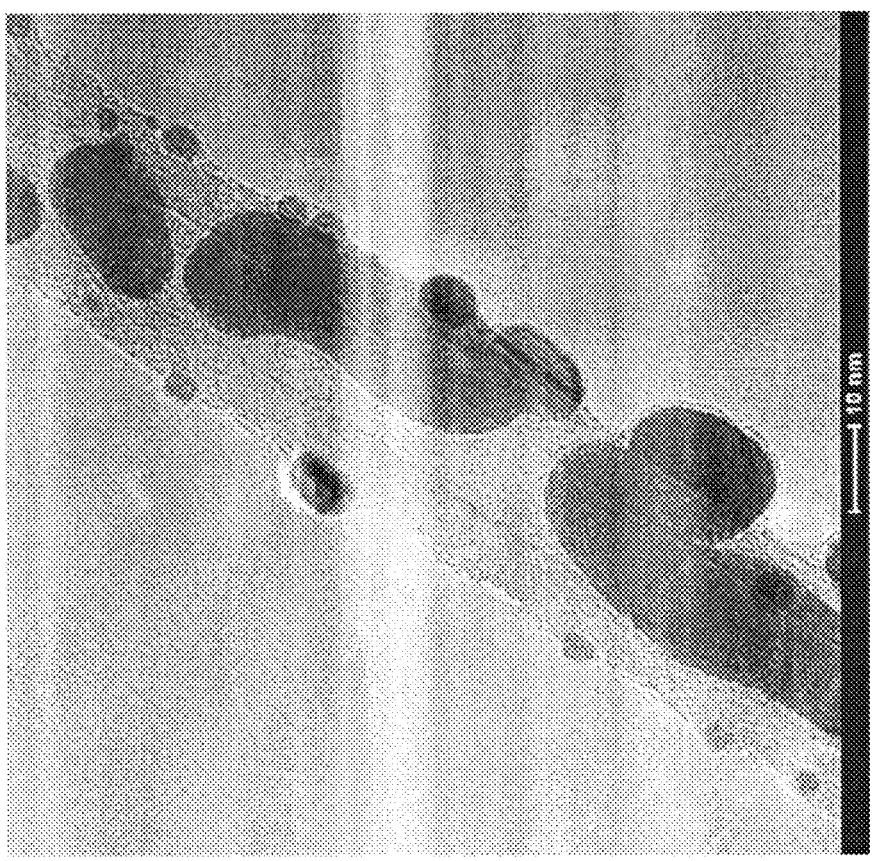
FIG. 6 shows a TEM image of a carbon nanotube with a gold layer of about 2 nanometers thick.
Figure 7:
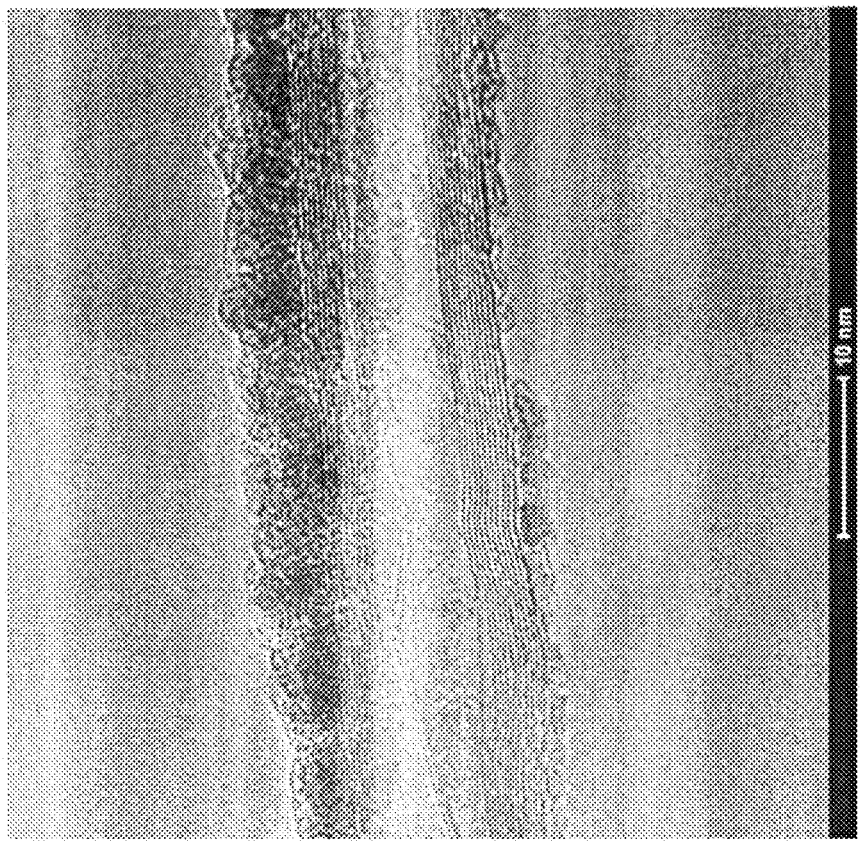
FIG. 7 shows a TEM image of a carbon nanotube with a titanium layer of about 2 nanometers thick.
Figure 8:
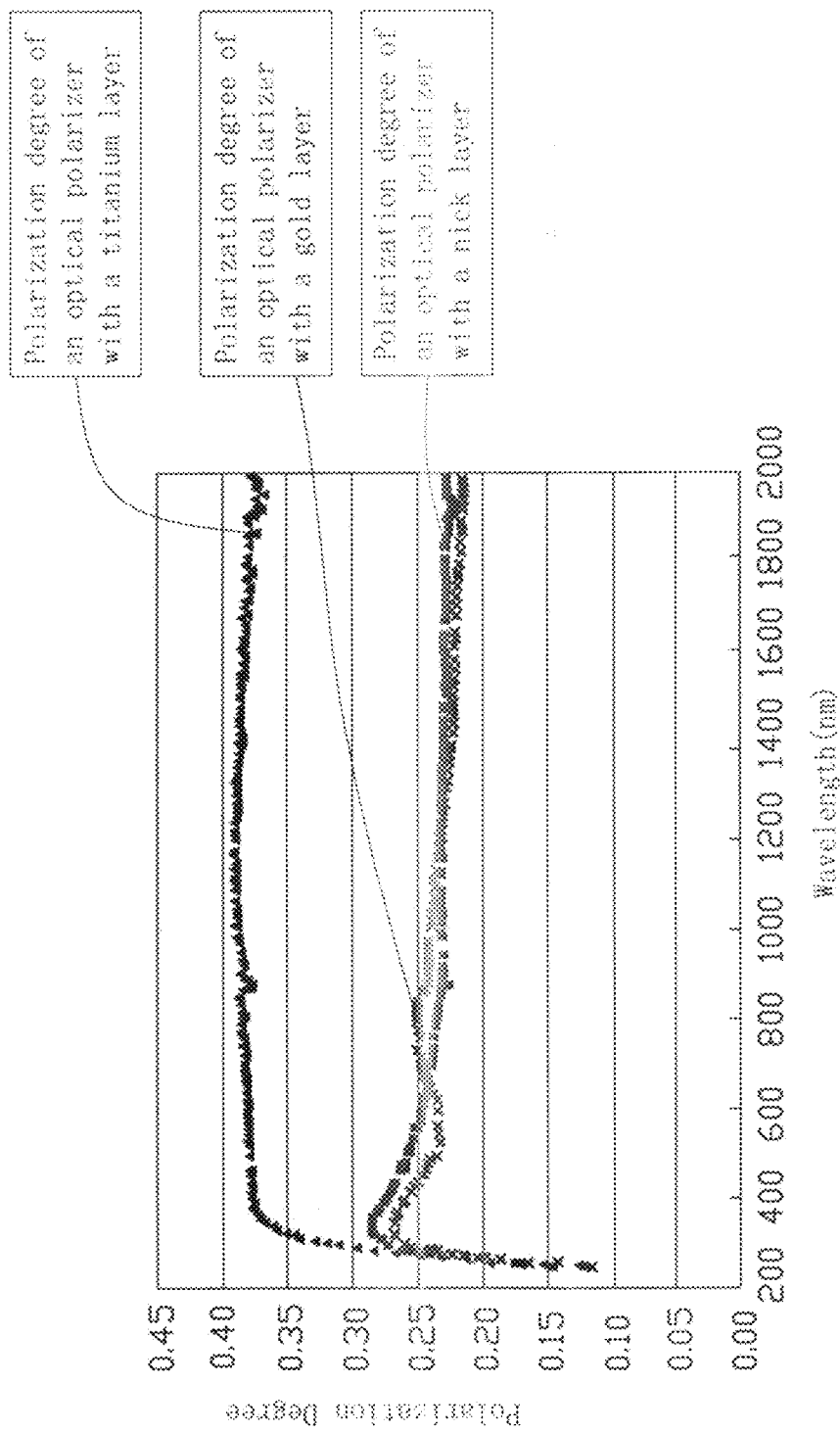
FIG. 8 shows a comparison of polarization degree curves of optical polarizers with different metallic layers.

Different materials of the metallic layer can have different polarization properties in different wavelength regions. Thus, the polarization degree of the optical polarizing film 120 can vary with the materials of the metallic layer, if the thickness of the metallic layer is a certain value. For example, referring to FIG. 5, a nickel layer with a thickness of about 2 nanometers is employed as the metallic layer to cover the top surface of the carbon nanotube film structure. Referring to FIG. 6 and FIG. 7, the metallic layer can also be a gold layer having a thickness of about 2 nanometers or a titanium layer having a thickness of about 2 nanometers. Polarization degree curves of the optical polarizing films 120 employing the nickel layer, the gold layer, and the titanium layer respectively, can be obtained as shown in FIG. 8. The optical polarizing film 120 employing the titanium layer can obtain a greater polarization degree than the optical polarizing film 120 employing the nickel layer or the gold layer. The optical polarizing film 120 employing the titanium layer has a polarization degree greater than 0.37, if the wavelength of the polarized light is greater than 300 nanometers.

Figure 9:
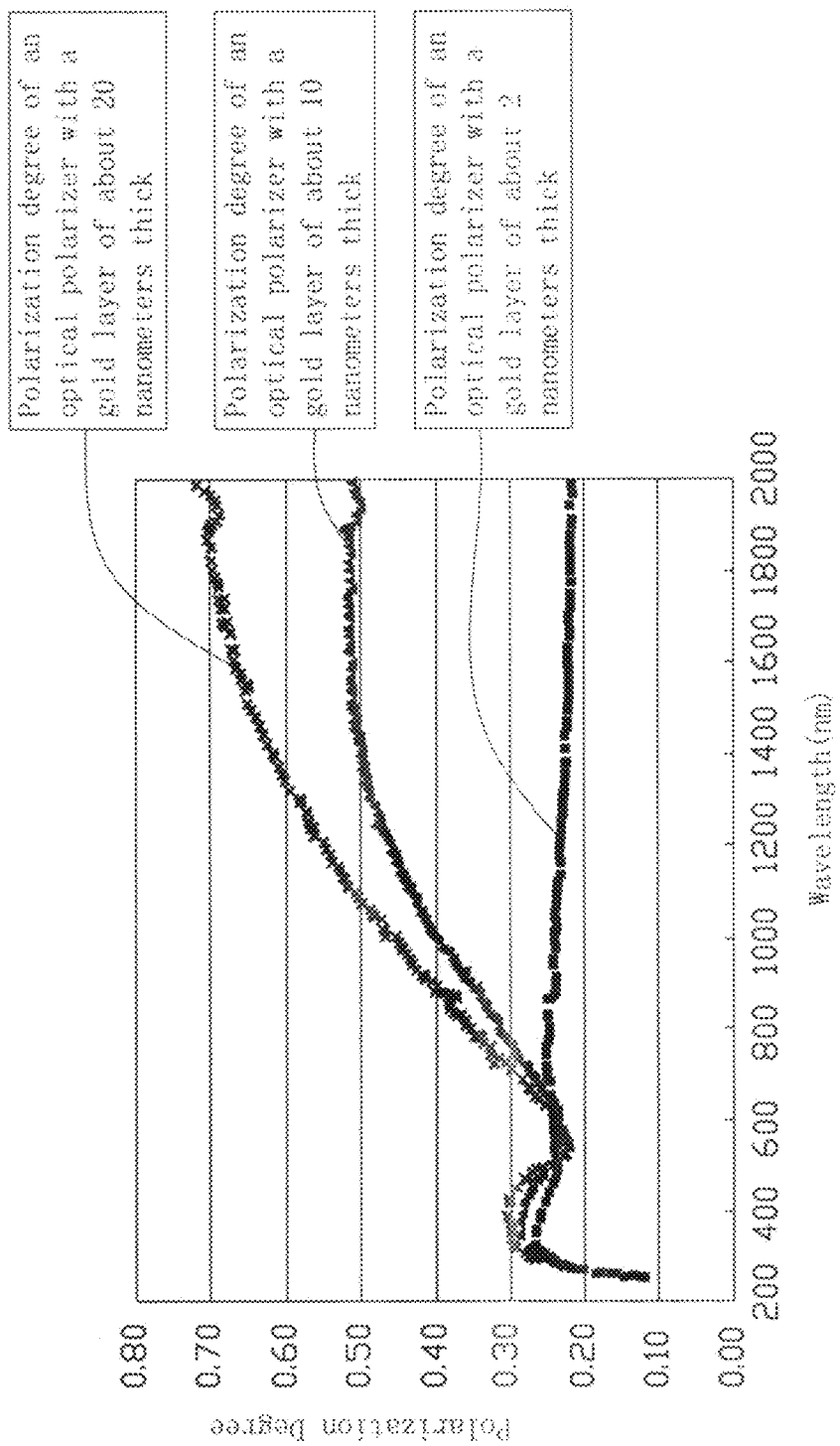
FIG. 9 shows a comparison of polarization degree curves of optical polarizers with a gold layer having different thickness.

The polarization degree of the optical polarizing film 120 can also vary with the thickness of metallic layers made of a same material. Gold layers with different thickness are employed as the metallic layer and cover the top surface of the carbon nanotube film structure. Polarization degree curves of the gold layers with a thickness of about 2 nanometers, 10 nanometers, or 20 nanometers respectively, can be obtained as shown in FIG. 9. As shown in FIG. 9, the polarization degree increases with an increase of the gold layer thickness, and the polarization degree in a wavelength region ranged from about 400 nanometers to about 2000 nanometers is greater than 0.20. Specifically, the thickness of the gold layer is about 10 nanometers and about 20 nanometers, and the polarization degree of the optical polarizer in a wavelength region ranged from about 800 nanometers to 2000 nanometers is greater than 0.30.

The polarizing film 120 of the optical polarizer 100 is made of the plurality of the carbon nanotubes and the metallic layer. The plurality of the carbon nanotubes and the metallic layer are capable of maintaining their polarization properties, when the polarizing film 120 works at a relatively high temperature, or in a relatively moist environment.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. An optical polarizer, comprising:
a supporting element; and
an optical polarizing film supported by the supporting element, the optical polarizing film comprising a carbon nanotube film structure and a metallic layer disposed on the carbon nanotube film structure, wherein the carbon nanotube film structure consists of a plurality of carbon nanotubes, the plurality of carbon nanotubes are joined end-to-end by van der Waals attractive force therebetween and substantially aligned in a single direction, and the metallic layer is located on entire outer surfaces of the plurality of carbon nanotubes; the metallic layer further comprises an amelioration layer, the amelioration layer is a gold layer having a thickness ranged from about 2 nanometers to about 20 nanometers, and a polarization degree of the optical polarizer in a wavelength region ranged from about 400 nanometers to about 2000 nanometers is greater than 0.20.

2. The optical polarizer of claim 1, wherein the carbon nanotube film structure is a free-standing structure comprising the plurality of carbon nanotubes, the carbon nanotubes in the carbon nanotube film structure all are aligned in a same direction.

3. The optical polarizer of claim 1, wherein the carbon nanotube film structure has two opposite surfaces; the metallic layer is disposed on at least one of the two opposite surfaces.

4. The optical polarizer of claim 1, wherein the carbon nanotube film structure has a thickness of about 0.5 nanometers to about 1 millimeter.

5. The optical polarizer of claim 4, wherein the polarization degree of the optical polarizing film increases with an increase in a thickness of the carbon nanotube film structure.

6. The optical polarizer of claim 1, wherein the carbon nanotube film structure comprises a drawn carbon nanotube film comprising the plurality of carbon nanotubes joined end-to-end by van der Waals attractive force therebetween.

7. The optical polarizer of claim 6, wherein the drawn carbon nanotube film has a thickness of about 0.5 nanometers to about 100 nanometers.

8. The optical polarizer of claim 1, wherein the carbon nanotube film structure comprises a plurality of layers of drawn carbon nanotube films stacked on each other; adjacent drawn carbon nanotube films are joined by the van der Waals attractive force therebetween.

9. The optical polarizer of claim 1, wherein the metallic layer has a thickness of about 1 nanometer to about 50 nanometers.

10. The optical polarizer of claim 9, wherein the polarization degree of the optical polarizing film increases with an increase in a thickness of the metallic layer.

11. The optical polarizer of claim 1, wherein the metallic layer further comprises a wetting layer; the wetting layer is in contact with the carbon nanotubes and capable of combining the carbon nanotubes with the amelioration layer.

12. The optical polarizer of claim 11, wherein the wetting layer has a thickness of about 1 nanometer to about 10 nanometers.

13. The optical polarizer of claim 12, wherein the wetting layer has a thickness of about 2 nanometers, a material of the wetting layer is nickel.

14. The optical polarizer of claim 1, wherein the polarization degree of the optical polarizer increases with an increase of the thickness of the gold layer.

15. The optical polarizer of claim 1, wherein the thickness of the gold layer is about 10 nanometers, and the polarization degree of the optical polarizer in a wavelength region ranged from about 800 nanometers to 2000 nanometers is greater than 0.30.

16. The optical polarizer of claim 1, wherein the thickness of the gold layer is about 20 nanometers, and the polarization degree of the optical polarizer in a wavelength region ranged from about 800 nanometers to 2000 nanometers is greater than 0.30.

* * * * *